(12) United States Patent
Yoon et al.

(10) Patent No.: US 9,382,360 B2
(45) Date of Patent: Jul. 5, 2016

(54) ELASTIC TERPOLYMER AND PREPARATION METHOD THEREOF

(71) Applicant: LG CHEM, LTD., Soeul (KR)

(72) Inventors: Sung-Cheol Yoon, Daejeon (KR); Jun-Seok Ko, Daejeon (KR); Sung-Ho Park, Daejeon (KR); Soo-Young Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/441,072

(22) PCT Filed: Nov. 15, 2012

(86) PCT No.: PCT/KR2012/009665
§ 371 (c)(1),
(2) Date: May 6, 2015

(87) PCT Pub. No.: WO2014/077429
PCT Pub. Date: May 22, 2014

(65) Prior Publication Data
US 2015/0344603 A1 Dec. 3, 2015

(30) Foreign Application Priority Data
Nov. 14, 2012 (KR) .................. 10-2012-0128788

(51) Int. Cl.
*C08F 210/18* (2006.01)
*C08F 4/68* (2006.01)
*C08F 2/06* (2006.01)
*C08L 23/16* (2006.01)

(52) U.S. Cl.
CPC ............... *C08F 210/18* (2013.01); *C08L 23/16* (2013.01)

(58) Field of Classification Search
CPC ......... C08F 4/6093; C08F 4/68; C08F 210/08
USPC ............... 526/143, 169.2, 282, 283
See application file for complete search history.

(56) References Cited

U.S. PATENT DOCUMENTS

| 4,420,595 A | 12/1983 | Evens |
| 4,435,552 A * | 3/1984 | Evens .................... C08F 10/16 502/154 |
| 2011/0282018 A1 | 11/2011 | Klosin |

FOREIGN PATENT DOCUMENTS

| CN | 102906129 A | 1/2013 |
| EP | 0 751 156 A2 | 1/1997 |
| JP | 57-44612 A | 3/1982 |
| JP | 06-039500 B2 | 5/1994 |
| JP | 2000034314 A | 2/2000 |
| JP | 2002145922 A | 5/2002 |
| JP | 2003160588 A | 6/2003 |
| JP | 2006290971 A | 10/2006 |
| KR | 10-2000-0010950 A | 2/2000 |
| KR | 10-2001-0014241 A | 2/2001 |
| KR | 10-2001-0020395 A | 3/2001 |
| KR | 10-2010-0090445 A | 8/2010 |
| KR | 10-2012-0016596 A | 2/2012 |
| KR | 10-2012-0057544 A | 6/2012 |
| NL | 1006421 C2 | 12/1998 |
| WO | 97/01586 A1 | 1/1997 |

OTHER PUBLICATIONS

"13C NMR Determination of Monomer Sequence Distribution in Ethylene-Propylene Copolymers Prepared with 6-TiC13-A1(C2H5%) C" Kakugo, et al.; Macromolecules 1982,15, 1150-1152.
Carbon-13 NMR of Ethylene-1-Olefin Copolymers:Extension to the Short-Chain Branch Distribution in a Low-Density Polyethylene Randall; Journal of Polymer Science: Polymer Physics Edition, vol. 11, 275-287 (1973).

* cited by examiner

*Primary Examiner* — Fred M Teskin
(74) *Attorney, Agent, or Firm* — Dentons US LLP

(57) ABSTRACT

The present invention relates to an elastic terpolymer that can acquire good mechanical properties and elasticity (flexibility) at the same time, and a preparation method thereof. The elastic terpolymer, which is a copolymer comprising 40 to 70 wt % of ethylene, 20 to 50 wt % of a $C_3$-$C_{20}$ alpha-olefin, and 2 to 20 wt % of a diene as obtained in the presence of a catalyst comprising a vanadium compound, satisfies that: (i) the weight average molecular weight measured by GPC is 100, 000 to 500,000; and (ii) in the monomer distribution of the copolymer determined by $^{13}C$ NMR analysis, K given by a defined Equation 1 is 0.01 or less.

9 Claims, 2 Drawing Sheets

ELASTIC TERPOLYMER AND PREPARATION METHOD THEREOF

This application is a National Stage Entry of International Application No. PCT/KR2012/009665, filed Nov. 15, 2012, and claims the benefit of Korean Application No. 10-2012-0128788, filed on Nov. 14, 2012, all of which are hereby incorporated by reference in their entirety for all purposes as if fully set forth herein.

TECHNICAL FIELD

The present invention relates to an elastic terpolymer that is a copolymer of ethylene, alpha-olefin, and diene, and a preparation method thereof. More specifically, the present invention relates to an elastic terpolymer that can acquire good mechanical properties and elasticity (flexibility) at the same time, and a preparation method thereof.

BACKGROUND

EPDM rubber, an elastic terpolymer of ethylene, an alpha-olefin such as propylene, and a diene such as ethylidene norbornene, has the molecular structure not including an unsaturated bond in the main chain and displays superiority to general conjugated diene rubbers in regards to weather resistance, chemical resistance, heat resistance, and so forth. Due to the characteristics, the elastic terpolymer such as EPDM rubber has been widely used for industrial materials, such as materials for all sorts of automobile parts, electric wires, hoses for construction or other use purposes, gaskets, belts, bumpers, a blend with plastics, etc.

The elastic terpolymer like EPDM rubber has been prepared mostly by copolymerizing three different monomers in the presence of a catalyst including a vanadium compound, such as a vanadium-based Ziegler-Natta catalyst. But the truth is that the preparation of the elastic terpolymer using copolymerization in the presence of a vanadium-based catalyst according to the conventional method not only leads to great deterioration in the catalytic activity of the catalyst for copolymerization but also makes it difficult to obtain an elastic terpolymer with sufficiently high molecular weight and good mechanical strengths.

Furthermore, the elastic terpolymer like EPDM rubber is required to have good elasticity and flexibility, but the conventional elastic terpolymers are, in many cases, poor in both elasticity and flexibility. The reason is presumably that the characteristic of the vanadium-based catalyst being suitable for low-temperature polymerization makes it difficult to control the reaction temperature. Another disadvantage of using the vanadium-based catalyst lies in that it is hard to control the up-take of the comonomers such as propylene, diene, etc.

To overcome the problems, there has been a sustained demand for developing an elastic terpolymer having good mechanical properties and elasticity (flexibility) at the same time and a method for preparing the same more effectively.

SUMMARY OF THE INVENTION

The present invention provides an elastic terpolymer that acquires good mechanical properties and elasticity (flexibility) at the same time.

Further, the present invention provides a preparation method for elastic terpolymer that makes it possible to prepare the elastic terpolymer more effectively.

The present invention provides an elastic terpolymer, which is a copolymer of 40 to 70 wt % of ethylene, 20 to 50 wt % of a $C_3$-$C_{20}$ alpha-olefin, and 2 to 20 wt % of a diene as obtained in the presence of a catalyst comprising a vanadium compound, where the elastic terpolymer satisfies that:

i) the weight average molecular weight measured by GPC is 100,000 to 500,000; and ii) in the monomer distribution of the copolymer determined by $^{13}C$ NMR analysis, K given by the following Equation 1 is 0.01 or less, $$K = [CCC]*[EEE] \quad \text{[Equation 1]}$$

In the Equation 1, [CCC] is the growth rate constant when the monomer distribution of the copolymer is "alpha-olefin-alpha-olefin-alpha-olefin"; and [EEE] is the growth rate constant when the monomer distribution of the copolymer is "ethylene-ethylene-ethylene".

The present invention further provides a method for preparing the elastic terpolymer that comprises copolymerizing 40 to 70 wt % of ethylene, 20 to 50 wt % of a $C_3$-$C_{20}$ alpha-olefin and 2 to 20 wt % of a diene in the presence of a catalyst composition comprising a vanadium compound represented by the following Chemical Formula 1, a halogen-containing organic compound represented by the following Chemical Formula 2, and a Lewis acid represented by the following Chemical Formula 3:

[Chemical Formula 1]

In the Chemical Formula 1, R is a $C_1$-$C_{20}$ hydrocarbon branch; X is halogen; and m is 0 to 3,

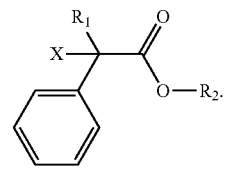
[Chemical Formula 2]

In the Chemical Formula 2, R1 is hydrogen, $C_1$-$C_{20}$ alkyl, $C_6$-$C_{40}$ aryl, or halogen; R2 is $C_1$-$C_{20}$ alkyl; and X is halogen, $$D_l X_j (R_3)_n \quad \text{[Chemical Formula 3]}$$

In the Chemical Formula 3, $R_3$ is hydrogen, $C_1$-$C_{20}$ alkyl, or $C_6$-$C_{40}$ aryl; X is halogen; D is boron or aluminum; and l, j and n are independently an integer from 1 to 6.

DETAILED DESCRIPTION OF THE EMBODIMENTS

Hereinafter, a detailed description will be given as to an elastic terpolymer and a preparation method for the same according to exemplary embodiments of the present invention.

Unless otherwise specified, the term "elastic terpolymer" used in this specification may be defined as follows. The term "elastic terpolymer" may refer to any elastic copolymer (for example, cross-linkable random copolymer) prepared by copolymerization of three different monomers of ethylene, a $C_3$-$C_{20}$ alpha-olefin, and a diene. A representative example of the "elastic terpolymer" is the EPDM rubber that is a copolymer of ethylene, propylene, and a diene. However, the term "elastic terpolymer" is not limited to the copolymer of three monomers only, but it may include any elastic copolymer prepared from ethylene, at least one monomer belonging to the category of alpha-olefin and at least one monomer belonging to the category of diene. For example, the elastic copolymer of ethylene, two different alpha-olefins such as propylene and 1-butene, and two different dienes such as ethylidene norbornene and 1,4-hexadiene may also belong to the category of the "elastic terpolymer", since it is prepared by copolymerization of three different monomers belonging to the categories of ethylene, alpha-olefin, and diene, respectively.

In accordance with one exemplary embodiment of the present invention, there is provided an elastic terpolymer, which is a copolymer of 40 to 70 wt % of ethylene, 20 to 50 wt % of a $C_3$-$C_{20}$ alpha-olefin, and 2 to 20 wt % of a diene as obtained in the presence of a catalyst comprising a vanadium compound, where the elastic terpolymer satisfies that:

ii) the weight average molecular weight measured by GPC is 100,000 to 500,000; and ii) in the monomer distribution of the copolymer determined by $^{13}$C NMR analysis, K given by the following Equation 1 is 0.01 or less, $$K=[CCC]*[EEE] \qquad \text{[Equation 1]}$$

In the Equation 1, [CCC] is the growth rate constant when the monomer distribution of the copolymer is "alpha-olefin-alpha-olefin-alpha-olefin"; and [EEE] is the growth rate constant when the monomer distribution of the copolymer is "ethylene-ethylene-ethylene".

The elastic terpolymer according to one exemplary embodiment, which is a polymer prepared by copolymerization of three different monomers of ethylene, alpha-olefin and diene, has a relatively high weight average molecular weight of about 100,000 to 500,000, or about 1,500,000 to 400,000, or 200,000 to 300,000 as measured by GPC. As will be described later in further detail, such a high weight average molecular weight can be acquired by realizing the higher catalytic activity as the copolymerization is carried out in the presence of a catalyst composition comprising a specific halogen-containing organic compound as well as a defined vanadium compound and a Lewis acid. As the elastic terpolymer according to one exemplary embodiment such as, for example, EPDM rubber has such a high molecular weight, it can display good mechanical properties.

The elastic terpolymer of one exemplary embodiment may have such a characteristic that K of the Equation 1 is about 0.01 or less, or about 0 to 0.007, or about 0 to 0.003 in the monomer distribution of the copolymer as derived from the $^{13}$C NMR analysis.

The individual growth rate constants, [CCC] and [EEE], for determining K represents the monomer distribution in the copolymer that can be measured by analyzing each copolymer using $^{13}$C NMR and particularly indicates how much the main monomers are distributed continuously as "-alpha-olefin-alpha-olefin-alpha-olefin" or "ethylene-ethylene-ethylene". The growth rate constants can be calculated from the results of the $^{13}$C-NMR analysis according to the Triad Sequence analysis using the Randall method [Journal of Polymer Science: Polymer Physics edition, 1973, 11, 275-287]. From the calculated growth rate constants, the value of K can be determined according to the above Equation.

When K is about 0.01 or less, it means that the monomers are highly unlikely to continuously distribute as "alpha-olefin-alpha-olefin-alpha-olefin" or "ethylene-ethylene-ethylene" in the chain of the copolymer, so ethylene and alpha-olefin are highly likely to distribute evenly and alternately in the chain of the copolymer. Contrarily, when K increases, the monomers are increasingly likely to continuously distribute, making the chain of the copolymer approaching the form of a block copolymer.

In this manner, when the value of K is about 0.01 or less, or about 0 to 0.007, or about 0 to 0.003, the elastic copolymer of one exemplary embodiment has a characteristic that the respective monomers are evenly and alternately arranged, so the degree of crystallization of the copolymer with respect to the ethylene content may not be high. As a result, the copolymer of one exemplary embodiment can display more enhanced elasticity and flexibility as required to the EPDM rubber or the like.

Therefore, the elastic terpolymer of one exemplary embodiment can not only satisfy high molecular weight and hence good mechanical properties but also display high elasticity and flexibility. This renders the elastic terpolymer of one exemplary embodiment to be very preferably used as the EPDM rubber or the like.

Meanwhile, the elastic terpolymer of one exemplary embodiment may have a characteristic that the growth rate constant of [CCC] is about 0.02 or less, or about 0 to 0.015, or about 0 to 0.001. Further, the elastic terpolymer of one exemplary embodiment may have a characteristic that the growth rate constant of [EEE] is about 0.5 or less, or about 0.1 to 0.45. As a result, the individual monomers can be arranged more evenly and alternately in the chain of the copolymer and the terpolymer of one exemplary embodiment can display more enhanced elasticity and flexibility.

In addition, the elastic terpolymer of one exemplary embodiment may satisfy the relational expression given by $1.6x-82.00 \leq y \leq 1.6x-77.00$, where x is the ethylene content (wt %) and y is the crystallization enthalpy ($\Delta Hc$; J/g) measured by DSC. For a specific example, it may satisfy the relational expression given by $y=1.6x-79.86$.

This relational expression as defined above means that for the elastic copolymer of one exemplary embodiment, the degree of crystallization with respect to the ethylene content in the chain of the copolymer is not that high but optimized. In this manner, the elastic copolymer of one exemplary embodiment satisfies the relational expression given by $1.6x-82.00 \leq y \leq 1.6x-77.00$ within the optimized range of the degree of crystallization with respect to the ethylene content, so it can display more enhanced elasticity and flexibility. Consequently, the terpolymer of one exemplary embodiment can be more preferably used as the EPDM rubber of the like.

In the elastic terpolymer of one exemplary embodiment, the relational expression of the ethylene content x and the crystallization enthalpy y can be measured as follows. Firstly, at least two different elastic terpolymers with different ethylene contents in the above-defined range of ethylene content are prepared through polymerization. Then, DSC curve data for each copolymer are acquired with a DSC measurement instrument such as, for example, PerkinElmer DSC 6000, etc. Such DSC curve data can be acquired, for example, in the form as shown in FIG. 2. In order to obtain the DSC curve data, a DSC analysis is carried out by heating each copolymer sample up to about 100° C. at the rate of about 0° C. to about 20° C. per minute, maintaining the corresponding temperature for about 2 minutes and then cooling down to about -150° C. at the rate of about -10° C./min. The DSC curve data thus obtained can be used to calculate the crystallization enthalpy and the average crystallization temperature Tc (° C.).

Data for each copolymer are displayed by plotting the ethylene content of the copolymer on the x-axis and the crystallization enthalpy measured for the copolymer on the y-axis. The data are then subjected to linear regression to determine the relational expression of the ethylene content x and the crystallization enthalpy y. An example of the relational expression of x and y is as illustrated in FIG. 3.

From the relational expression of x and y in the elastic terpolymer of one exemplary embodiment as obtained by the above-described method, it can be seen hat the elastic terpolymer has a lower crystallization enthalpy with respect to the ethylene content than the existing EPDM. This also shows that the elastic terpolymer can satisfy the relational expression given by y 1.6x−77.00. Through this, the elastic terpolymer of one exemplary embodiment can acquire high elasticity and flexibility as well as good mechanical properties as a result of the high molecular weight. Therefore, the elastic terpolymer of one exemplary embodiment can display high elasticity and flexibility as required to the EPDM rubber. Furthermore, the elastic terpolymer also satisfies the relational expression given by 1.6x−82.00≤y and thus acquires the crystallization enthalpy to a minimum level or above with respect to the ethylene content, so it can display appropriate mechanical properties and heat resistance as required to the EPDM rubber.

And, the elastic terpolymer of one exemplary embodiment can satisfy the above-specified relational expression of the ethylene content and the crystallization enthalpy in the entire content ranges of the monomers that lead to appropriate properties as required to the EPDM rubber or the like, that is, for example, about 40 to 70 wt % or about 50 to 70 wt % of ethylene, about 15 to 55 wt % or about 25 to 45 wt % of a $C_3$-$C_{20}$ alpha-olefin, and 0.5 to 20 wt % or about 2 to 8 wt % of a diene. Therefore, the elastic terpolymer can preferably acquire more enhanced elasticity and flexibility as the EPDM rubber. When the content of each monomer is out of the above-defined range, the elastic terpolymer can neither acquire appropriate properties as the EPDM rubber nor satisfy the above-specified relational expression of the ethylene content and the crystallization enthalpy.

The elastic terpolymer of one exemplary embodiment may also have a characteristic that the product of the reactivity ratio constant Re representing the distribution state of ethylene in the copolymer and the reactivity ratio constant Rc representing the distribution state of alpha-olefin in the copolymer, that is, Re*Rc is less than about 1, for example, about 0.40 to 0.99, or about 0.50 to 0.80.

From the above specific value, Re=k11/k12 and Rc=k22/k21, where k11 is the growth rate constant when ethylene comes after ethylene in the chain of the copolymer; k12 is the growth rate constant when alpha-olefin comes after ethylene in the chain of the copolymer; k21 is the growth rate constant when ethylene comes after alpha-olefin in the chain of the copolymer; and k22 is the growth rate constant when alpha-olefin comes after alpha-olefin in the chain of the copolymer.

The individual growth rate constants, that is, k11, k12, k21 and k22 can be measured by analyzing each copolymer using $^{13}$C-NMR. For example, the value of Re*Rc can be calculated from the results of the $^{13}$C-NMR analysis according to the Triad Sequence analysis using the Randall method [Journal of Polymer Science: Polymer Physics edition, 1973, 11, 275-287] and the Kakugo method [Macromolecules 1982, 15, 1150].

When the value of Re*Rc is less than about 1, it means that the chain of the copolymer is highly likely to have alpha-olefin come after ethylene and ethylene after alpha-olefin, leading to an alternating distribution of ethylene and alpha-olefin. Contrarily, when the value of Re*Rc is about 1, it means that the copolymer chain has a random distribution of the ethylene and alpha-olefin monomers. When the value of Re*Rc is greater than about 1, it means that the monomers of the same type bind together to form the copolymer chain in the form of a block copolymer.

As the value of Re*Rc is less than about 1, for example, about 0.80 to 0.99, the elastic terpolymer of one exemplary embodiment can have the arrangement of the monomers in an even and alternating manner. This leads to having the degree of crystallization not that high, so the copolymer can display more enhanced elasticity and flexibility as required to the EPDM rubber or the like.

On the other hand, the crystallization temperature Tc of the elastic terpolymer of one exemplary embodiment as measured by the DSC method may be in the range of −55 to 30° C. or about −40 to 15° C. In this regard, the crystallization temperature can be measured in a manner of obtaining DSC curve data in the above-described method and then calculating the average crystallization temperature from the DSC curve data. As the copolymer has such a range of the crystallization temperature, it can display good elasticity and flexibility and more enhanced processability and heat resistance as the EPDM rubber or the like.

And, the elastic terpolymer of one exemplary embodiment may have a density in the range for acquiring appropriate properties as the EPDM rubber or the like, for example, about 0.840 to 0.895 g/cm$^3$ or about 0.850 to 0.890 g/cm$^3$.

In the elastic terpolymer of one embodiment, the alpha-olefin may include at least one $C_3$-$C_{20}$ alpha-olefin selected from propylene, 1-butene, 1-hexene, 1-octene, 1-pentene, 4-methyl-1-pentene, 1-hexene, 1-heptene, 1-decene, 1-undecene, 1-dodecene, 1-tridecene, 1-tetradecene, 1-pentadecene, 1-hexadecene, 1-heptadecene, 1-nonadecene, 9-methyl-1-decene, 11-methyl-1-dodecene, 12-ethyl-1-tetradecene, and so on. Among them, propylene, 1-butene, 1-hexene, or 1-octene may be properly used as the $C_3$-$C_{20}$ alpha-olefin. Further, unconjugated diene-based monomers may be used as the diene. Specific examples of the diene may include 5-ethylidene-2-norbornene, 5-methylene-2-norbornene, 5-vinyl-2-norbornene, 5-(2-prophenyl)-2-norbornene, 5-(3-butenyl)-2-norbornene, 5-(1-methyl-2-prophenyl)-2-norbornene, 5-(4-pentenyl)-2-norbornene, 5-(1-methyl-3-butenyl)-2-norbornene, 5-(5-(hexenyl)-2-norbornene, 5-(1-methyl-4-pentenyl)-2-norbornene, 5-(2,3-dimethyl-3-butenyl)-2-norbornene, 5-(2-ethyl-3-butenyl)-2-norbornene, 5-(6-heptenyl)-2-norbornene, 5-(3-methylhexenyl)-2-norbornene, 5-(3,4-dimethyl-4-pentenyl)-2-norbornene, 5-(3-ethyl-4-pentenyl)-2-norbornene, 5-(7-octenyl)-2-norbornene, 5-(2-methyl-6-heptenyl)-2-norbornene, 5-(1,2-dimethyl-5-hexenyl)-2-norbornene, 5-(5-ethyl-5-hexenyl)-2-norbornene, 5-(1,2,3-trimethyl-4-pentenyl)-2-norbornene, 5-propylidene-2-norbornene, 5-isopropylidene-2-norbornene, 5-butylidene-2-norbornene, 5-isobutylidene-2-norbornene, 2,3-diisopropylidene-5-norbornene, 2-ethylidene-3-isopropylidene-5-norbornene, 2-propenyl-2,2-norbornadiene, 1,4-hexadiene, dicyclopentadiene, and so forth, out of which at least one diene may be selected. Among these, 5-ethylidene-2-norbornene, 5-methylene-2-norbornene, 5-vinyl-2-norbornene, 1,4-hexadiene, or dicyclopentadiene may be properly used as the diene.

In accordance with another exemplary embodiment of the present invention, there is provided a method for preparing the elastic terpolymer that comprises copolymerizing 40 to 70 wt % of ethylene, 20 to 50 wt % of a $C_3$-$C_{20}$ alpha-olefin and 2 to 20 wt % of a diene in the presence of a catalyst composition comprising a vanadium compound represented by the following Chemical Formula 1, a halogen-containing organic compound represented by the following Chemical Formula 2, and a Lewis acid represented by the following Chemical Formula 3:

  [Chemical Formula 1]

In the Chemical Formula 1, R is a $C_1$-$C_{20}$ hydrocarbon branch; X is halogen; and m is 0 to 3,

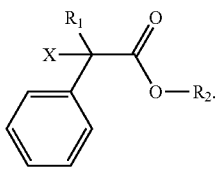

[Chemical 2]

In the Chemical Formula 2, R1 is hydrogen, $C_1$-$C_{20}$ alkyl, $C_6$-$C_{40}$ aryl, or halogen; R2 is $C_1$-$C_{20}$ alkyl; and X is halogen, $$D_lX_j(R_3)_n$$ [Chemical Formula 3]

In the Chemical Formula 3, $R_3$ is hydrogen, $C_1$-$C_{20}$ alkyl, or $C_6$-$C_{40}$ aryl; X is halogen; D is boron or aluminum; and l, j and n are independently an integer from 1 to 6.

As recognized in the following Examples, the elastic terpolymer of one exemplary embodiment that satisfies the high molecular weight range and the range of K as mentioned above can be obtained with high yield and productivity by using a defined content of monomers, namely, about 40 to 70 wt % or about 50 to 70 wt % of ethylene, about 15 to 55 wt % or about 25 to 45 wt % of a $C_3$-$C_{20}$ alpha-olefin, and about 0.5 to 20 wt % or about 2 to 8 wt % of a diene and copolymerizing the monomers in the presence of a defined vanadium compound of the Chemical Formula 1, a specific halogen-containing organic compound of the Chemical Formula 2, and a Lewis acid of the Chemical Formula 3.

It may be particularly due to the use of the specific halogen-containing organic compound of the Chemical Formula 2. Such a specific halogen-containing organic compound has an interaction with the vanadium compound of the Chemical Formula 1 to enhance the polymerization activity of the catalyst compound and allows high selectivity to the comonomers having a high molecular weight, such as, for example, alpha-olefin, diene, etc. As the copolymerization is carried out in the presence of the first and second compounds, the comonomers with a relatively high content are distributed evenly and alternately in the chain of the copolymer. The reason presumably lies in that the halogen-containing organic compound of the Chemical Formula 2 can interact with the catalyst compound of the Chemical Formula 1 while it is coordinated with the cationic vanadium central metal during the polymerization reaction. In other words, such an interaction allows a selective steric hindrance by the halogen-containing organic compound having a high electro-negativity to strengthen the cationic characteristic of the vanadium central metal, thereby enhancing the selectivity, copolymerization ability and polymerization activity of the comonomers.

Therefore, according to the preparation method of one exemplary embodiment, such a high polymerization activity of the catalyst is achieved to prepare an elastic terpolymer having a high molecular weight and the individual monomers evenly and alternately distributed, with high productivity and yield. The elastic terpolymer thus obtained has a characteristic that the individual monomers are evenly and alternately distributed. This shows it possible to prepare the elastic terpolymer of one exemplary embodiment with high productivity and yield, where the elastic terpolymer satisfies the above-mentioned characteristics of one exemplary embodiment, such as, for example, the range of K and the relational expression of the ethylene content x and the crystallization enthalpy y as given by 1.6x−82.00≤y≤1.6x−77.00. As described above, the elastic terpolymer of one exemplary embodiment that satisfies such characteristics has the degree of crystallization with respect to the ethylene content optimized no to be that high and thus displays good mechanical properties and more enhanced elasticity or the like at the same time, so it can be very desirably used as the EPDM rubber or the like.

In addition, by controlling the content of the monomers within an optimized range, that is, about 40 to 70 wt % or about 50 to 70 wt % of ethylene, about 15 to 55 wt % or about 25 to 45 wt % of a $C_3$-$C_{20}$ alpha-olefin, and about 0.5 to 20 wt % or about 2 to 8 wt % of a diene, the monomers can be distributed more evenly and alternately in the chain of the copolymer. This makes it possible to effectively prepare an elastic terpolymer that satisfies the characteristics of one exemplary embodiment.

Without using the halogen-containing organic compound of the Chemical Formula 2, the final elastic terpolymer product may not satisfy the characteristics of the one exemplary embodiment, such as the high molecular weight range or the range of K.

In the above-specified preparation method for the elastic terpolymer of one exemplary embodiment, the vanadium compound of the Chemical Formula 1 may be a general vanadium-containing catalyst compound belonging to the category of the Chemical Formula 1, such as, for example, vanadium-containing oxy halogenated compounds, vanadium oxy acetylacetonate, or vanadium oxy alkoxide. Specific examples of the vanadium-containing catalyst compound may include vanadium oxy chloride, vanadium oxy bromide, vanadium oxy acetylacetonate, vanadium oxy tributoxide, etc. Among these, the vanadium oxy halogenated compound may be properly selected in consideration of high catalystic activity.

In addition, the halogen-containing organic compound of the Chemical

Formula 2 included together with the vanadium compound of the Chemical Formula 1 in the catalyst composition may be a compound in which R1 is $C_1$-$C_{20}$ alkyl (e.g., methyl or ethyl); X is halogen (e.g., Cl, Br, or I); and R2 is alkyl (e.g., methyl or ethyl). The use of the compound can greatly enhance the polymerization activity of the vanadium compound of the Chemical Formula 1 as a catalyst, thereby making it possible to more effectively prepare an elastic terpolymer of one exemplary embodiment that acquires good properties.

The vanadium compound of the Chemical Formula 1 and the halogen-containing organic compound of the Chemical Formula 2 may be directly synthesized according to a known method, or the corresponding compounds commercially available may be purchased without specific limitation.

In the above-specified preparation method of another exemplary embodiment, the catalyst composition further comprises a Lewis acid of the following Chemical Formula 3 as a cocatalyst compound, in addition to the vanadium compound of the Chemical Formula 1 and the halogen-containing organic compound of the Chemical Formula 2:

$$D_lX_j(R_3)_n$$ [Chemical Formula 3]

In the Chemical Formula 3, $R_3$ is hydrogen, $C_1$-$C_{20}$ alkyl, or $C_6$-$C_{40}$ aryl; X is halogen; D is boron or aluminum; and l, j and n are independently an integer from 1 to 6.

The Lewis acid that is a kind of a cocatalyst compound can enhance the activity of the vanadium compound of the Chemical Formula 1. The Lewis acid may include any organoaluminum compound or any organoboron compound belonging to the category of the Chemical Formula 3 without any specific limitation. Preferably, the organoaluminum compound may be used. Specific examples of the organoaluminum compound may include trimethyl aluminum, triethyl aluminum, triisobutyl aluminum, diethylaluminum monochloride, ethylaluminum sesquichloride, ethylaluminum dichloride, etc. Specific examples of the organoboron compound may include trimethylboron, triethylboron, triisobutylboron, tribromoboron, trichloroboron, triethylborate, trimethylborate, triisobutylborate, triphenylboron, tris(pentafluorophenyl)boron, etc.

The Lewis acid in combination with the vanadium compound of the Chemical Formula 1 and the compound of the Chemical Formula 2 may be diluted with the polymerization solvent or a separate solvent. The Lewis acid may also be directly synthesized according to a known method, or any Lewis acid commercially available may be purchased without specific limitation.

In the catalyst composition including the vanadium compound of the Chemical Formula 1, the compound of the Chemical Formula 2, and the Lewis acid of the Chemical Formula 3, the molar ratio of the vanadium compound of the Chemical Formula 1 to the compound of the Chemical Formula 2 may be about 1:1 to 1:10, and the molar ratio of the vanadium compound of the Chemical Formula 1 to the Lewis acid of the Chemical Formula 3 may be about 1:1 to 1:100.

In the preparation method of the elastic terpolymer, the catalyst composition may be diluted or dissolved with the polymerization solvent or other solvents. Specific examples of the solvent may include, but are not limited to, aliphatic hydrocarbon-based solvents, such as pentane, hexane, heptane, etc.; or aromatic solvents, such as benzene, toluene, etc.

The types of the alpha-olefin and diene available for the monomer composition are as mentioned above. Among them, the monomers generally used for the preparation of the EPDM rubber may be properly used. For example, the alpha-olefin may be at least one of propylene, 1-butene, 1-hexene, or 1-octene, and the diene may be at least one of 5-ethylidene-2-norbornene, 5-methylene-2-norbornene, 5-vinyl-2-norbornene, 1,4-hexadiene, or dicyclopentadiene.

And, in the preparation method of the terpolymer according to another embodiment, the copolymerizing step may be carried out at the temperature of about 40 to 200° C. or about 50 to 180° C. The copolymerization may be carried out in the form of different methods, such as suspension polymerization, solution polymerization, slurry polymerization, or gas phase polymerization. Appropriately, the copolymerization may be conducted in the solution polymerization process. In this regard, the above-described catalyst composition may be used in the form of a homogeneous catalyst dissolved in the solution.

According to the present invention, as described above, an elastic terpolymer can be prepared to display good mechanical properties and more enhanced elasticity and flexibility and thus very preferably used as the EPDM rubber or the like. According to the present invention, there is also provided a method of preparing the elastic terpolymer with high productivity and yield.

The elastic terpolymer prepared according to the present invention can overcome the limitations of the existing EPDM rubber and acquire good elasticity and flexibility as well as other properties and thus can be very desirably used as the EPDM rubber of the like.

EXAMPLES

Figure 1:
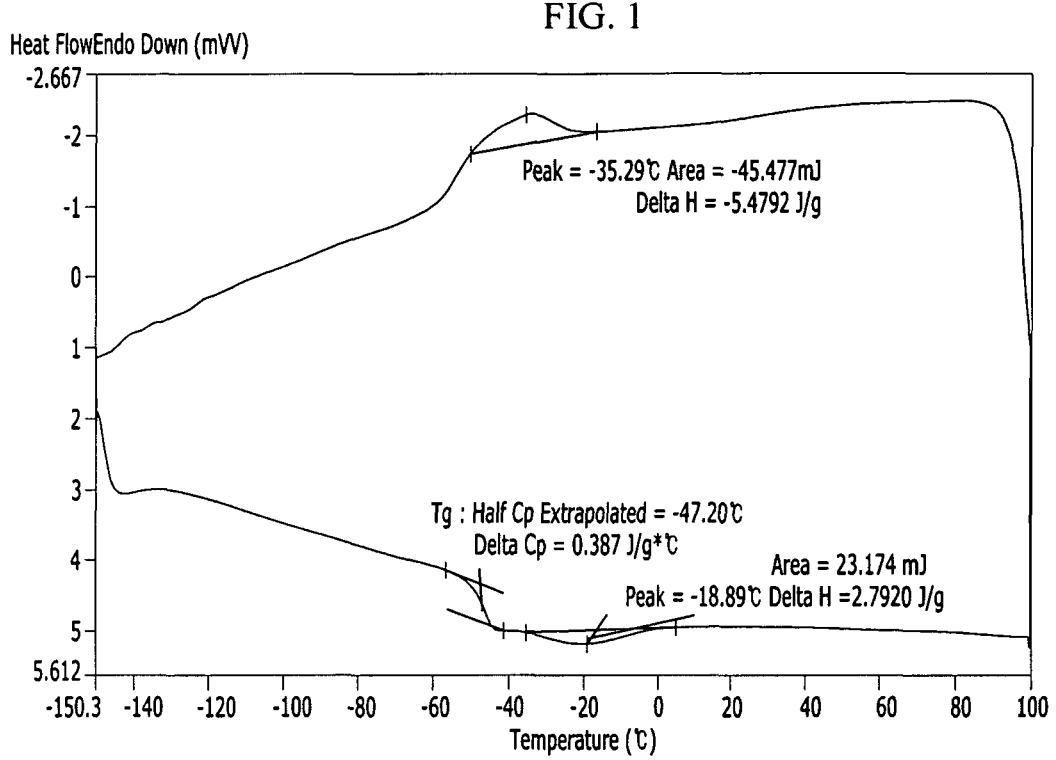
FIG. 1 shows the DSC curve data of an elastic terpolymer prepared in Comparative Example 1.

Hereinafter, the present invention is explained in more detail by referring to the following Examples. However, the following Examples are only for exemplifying the invention and the substances of the invention are not limited to or by them.

Examples 1, 2 and 3

Preparation of elastic terpolymer of ethylene, propylene and 5-ethylidene-2-norbornene Into a 2 L pressure reactor were added 440 g of hexane as a solvent and then 9 g of 5-ethylidene-2-norbornene and 31 g of propylene. Subsequently, the reactor was preheated up to 50° C., while the pressure of the reactor was maintained at 5 bar using ethylene. With the inside of the reactor sufficiently saturated with the ethylene gas, 0.5 mmol of vanadium oxy chloride ($VOCl_3$), 2.5 mmol of ethyl alpha-chlorophenyl acetate and 10 mmol of ethylaluminum sesquichloride were added into the reactor to conduct the reaction for 30 minutes.

After completion of the reaction, the injection of the ethylene gas was terminated and the residual ethylene gas in the reactor was eliminated. Then, an excess of ethanol was added to the copolymer solution obtained from the reaction to precipitate the copolymer. The copolymer thus obtained was wished with two to three times and then filtered out to eliminate the solvent. The copolymer was dried out in a vacuum oven at 60° C. under vacuum to prepare the elastic terpolymer of Example 1. Elastic terpolymers of Examples 2 and 3 were prepared in the same manner as described in Example 1, excepting that the conditions presented in Table 1 (i.e., the pressure for feeding the ethylene gas and the added amount of propylene) were varied.

For each copolymer thus obtained, the content of each monomer, the activity of the catalyst, and the weight average molecular weight of the copolymer are presented in Table 1. In this regard, the weight average molecular weight of each copolymer was measured with PL-GPC 220 (Polymer Laboratory Ltd.) equipped with three linear-mixed bed columns. The measurement was carried out at 160° C. using 1,2,4-trichlorobenzene as a solvent at the flux of 1.0 ml/min.

Comparative Examples 1 and 2

Elastic terpolymer of ethylene, propylene, and 5-ethylidene-2-norbornene

Elastic terpolymers of Comparative Examples 1 and 2 were prepared in the same manner as described in Examples 1, 2 and 3, excepting that ethyl alpha-chlorophenyl acetate belonging to the category of the Chemical Formula 2 was not used and that the conditions presented in Table 1 (i.e., the pressure for feeding the ethylene gas and the added amount of propylene) were varied.

For each copolymer thus obtained, the content of each monomer, the activity of the catalyst, and the weight average molecular weight of the copolymer are presented in Table 1. In this regard, the weight average molecular weight of each copolymer was measured with PL-GPC 220 (Polymer Laboratory Ltd.) equipped with three linear-mixed bed columns. The measurement was carried out at 160° C. using 1,2,4-trichlorobenzene as a solvent at the flux of 1.0 ml/min.

TABLE 1

| Div. | Example 1 | Example 2 | Example 3 | Comparative Example 1 | Comparative Example 2 |
|---|---|---|---|---|---|
| Ethylene gas feeding pressure (bar) | 5 | 6 | 5 | 5 | 6 |
| Added amount of propylene (g) | 31 | 60 | 62 | 31 | 60 |
| Ethylene content (wt %) | 67.1 | 52.3 | 50.0 | 63.7 | 59.0 |
| Propylene content (wt %) | 29.4 | 43.4 | 42.7 | 31.3 | 36.9 |
| 5-ethylidene-2-norbornene content (wt %) | 3.5 | 4.3 | 7.3 | 5.0 | 4.1 |
| Catalytic activity (kg/g · hr) | 60 | 120 | 70 | 15 | 10 |
| Mw (g/mol) | 1866223 | 174371 | 212663 | 149293 | 132089 |

Referring to Table 1, the copolymers of Examples 1, 2 and 3 have a relatively high weight average molecular weight of 100,000 to 500,000, particularly higher than the copolymers of Comparative Examples 1 and 2. It is thus predicted that the copolymers display more enhanced mechanical properties. By using the halogen-containing organic compound of the Chemical Formula 2, the copolymers of the Examples 1, 2 and 3 are much superior in the catalystic activity to the copolymers of the Comparative Examples.

Experimental Example 1

Determination of K and Re*Rc

Each copolymer of Examples and Comparative Examples was analyzed using $^{13}$C-NMR to determine the individual growth rate constants of [ECE], [ECC], [CCC], [CEC], [CEE], and [EEE]. In this regard, [CCC] is the growth rate constant when the distribution of the monomers in the copolymer is "alpha-olefin(propylene)-alpha-olefin(propylene)-alpha-olefin(propylene)"; [EEE] is the growth rate constant when the distribution of the monomers in the copolymer is "ethylene-ethylene-ethylene"; and [ECE], [ECC], [CEC], and [CEE] are defined in the similar manner. Each of the growth rate constants was calculated from the $^{13}$C-NMR data by way of the Triad Sequence analysis using the Randall method [Journal of Polymer Science: Polymer Physics edition, 1973, 11, 275-287]. Each value of the growth rate constants was applied to Equation 1 given by K=[CCC]*[EEE] to determine K. Each growth rate constant and the value of K thus determined are presented in Table 2. For the $^{13}$C-NMR analysis, the measurement instrument was Bruker DRX 600 (600 MHz), and each copolymer was dissolved in ortho-dichlorobenzene-d4 solvent and analyzed at 100° C.

In addition, each copolymer of Examples and Comparative Examples was analyzed using $^{13}$C-NMR to determine the individual growth rate constants, K11, K12, K21, and K22. Each growth rate constant was calculated from the $^{13}$C-NMR data by way of the Triad Sequence analysis using the Randall method [Journal of Polymer Science: Polymer Physics edition, 1973, 11, 275-287] and the Kakugo method [Macromolecules 1982, 15, 1150]. Then, the value of Re*Rc was calculated based on the equations given by Re=k11/k12 and Rc=k22/k21. The value of Re*Rc for each polymer is presented in Table 2.

TABLE 2

|  | Example 1 | Example 2 | Example 3 | Comparative Example 1 | Comparative Example 2 |
|---|---|---|---|---|---|
| Propylene content (wt %) | 29.4 | 43.4 | 42.7 | 31.3 | 36.9 |
| 5-ethylidene-2-norbornene content (wt %) | 3.5 | 4.3 | 7.3 | 5.0 | 4.1 |
| [ECE] | 0.151 | 0.168 | 0.173 | 0.125 | 0.127 |
| [ECC] | 0.070 | 0.196 | 0.186 | 0.198 | 0.098 |
| [CCC] | 0.005 | 0.000 | 0.010 | 0.068 | 0.025 |
| [CEC] | 0.033 | 0.067 | 0.065 | 0.064 | 0.037 |
| [CEE] | 0.305 | 0.397 | 0.402 | 0.311 | 0.277 |
| [EEE] | 0.437 | 0.173 | 0.164 | 0.243 | 0.437 |
| K | 0.0021 | 0.0000 | 0.0016 | 0.0164 | 0.0108 |
| Re * Rc | 0.682 | 0.516 | 0.530 | 1.241 | 1.301 |

Referring to Table 2, as for the copolymers of Examples 1, 2 and 3, the value of K is 0.01 or less and Re*Rc is less than 1.

Contrarily, as for the copolymers of Comparative Examples 1 and 2, the value of K is greater than 0.01 and Re*Rc is greater than 1. It can be seen the results that the elastic copolymers of Examples 1, 2 and 3 have the individual monomers evenly distributed in the alternating arrangement and thus display the lower degree of crystallization with respect to the ethylene content and the higher elasticity and flexibility than the copolymers of Comparative Examples.

Experimental Example 2

Figure 2:
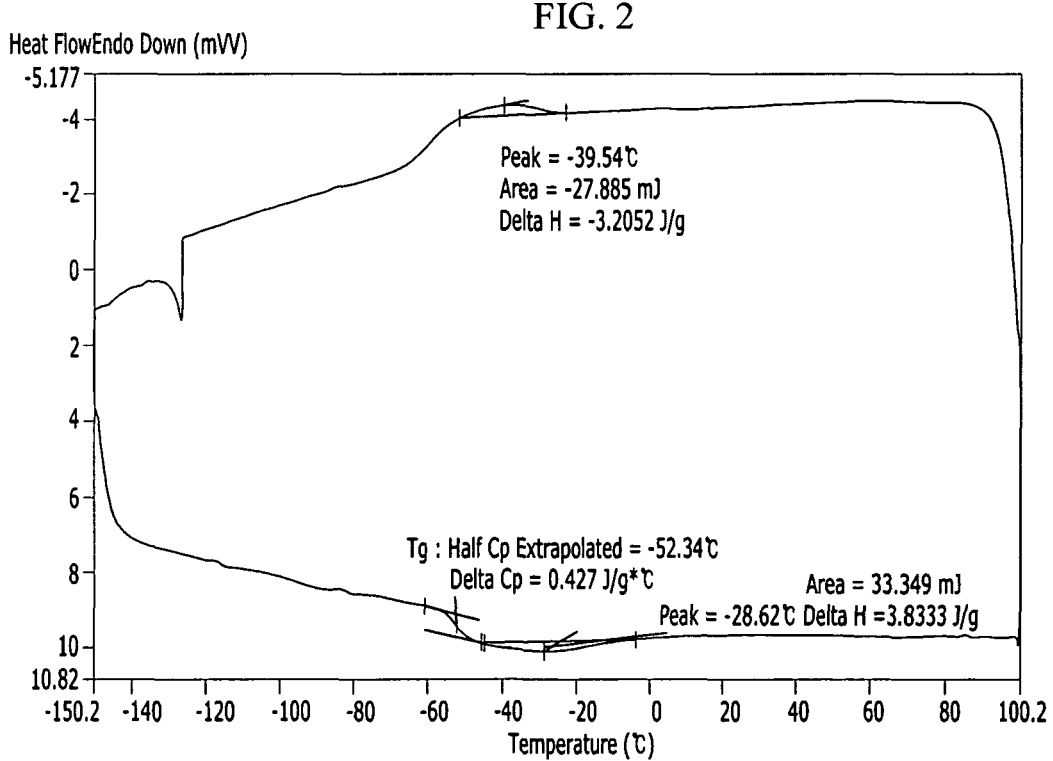
FIG. 2 shows the DSC curve data of an elastic terpolymer prepared in Example 2.

Measurement of Crystallization Enthalpy and Determination of Relational Expression of Ethylene Content and Crystallization Enthalpy For the copolymers of the Examples and Comparative Examples, DSC curve data were acquired using a DSC measurement instrument (PerkinElmer DSC 6000). More specifically, each copolymer sample was subjected to the DSC analysis by heating up to about 100° C. at the rate of about 0° C./min to about 20° C./min, maintaining at 100° C. for about 2 minutes and then cooling down to about −150° C. at the rate of about −10° C./min. The DSC curve data of Comparative Example 1 and Example 2 thus obtained are presented in FIGS. 1 and 2, respectively.

From the DSC curve data, the crystallization enthalpy and the average crystallization temperature Tc (° C.) of each copolymer were calculated. The average crystallization temperature was determined as the crystallization temperature of each copolymer. The crystallization temperature and the crystallization enthalpy of each copolymer are presented in Table 3.

The data for each copolymer were displayed by plotting the content of ethylene included in the copolymer on the x-axis and the crystallization enthalpy measured for the copolymer on the y-axis. The data were subjected to linear regression to determine the relational expression of the ethylene content x and the crystallization enthalpy y. The relational expression is as illustrated in FIG. 3, which also presents the data of Comparative Examples 1 and 2 for the comparison with the data of Examples.

TABLE 3

|  | Example | | | Comparative Example | |
|---|---|---|---|---|---|
|  | 1 | 2 | 3 | 1 | 2 |
| Ethylene content (wt %) | 67.1 | 52.3 | 50.0 | 63.7 | 59.0 |
| 5-ethylidene-2-norbornene content (wt %) | 3.5 | 4.3 | 7.3 | 5.0 | 4.1 |
| Crystallization temperature (° C.) | 6.8 | −39.5 | −44 | −35.3 | 6.81 |
| Crystallization enthalpy (J/g) | 27.1 | 3.2 | 0.7 | 5.5 | 22.2 |

Figure 3:
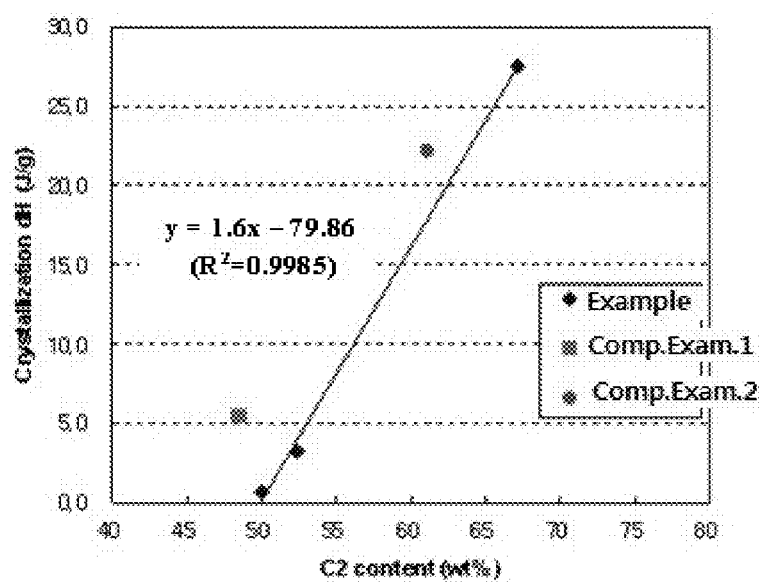
FIG. 3 is a graph showing the relational expression of the ethylene content x and the crystallization enthalpy y in the respective elastic terpolymers prepared in Examples 1 to 6 and Comparative Examples 1 and 2.

Referring to Table 3 and FIG. 3, the copolymers of Examples 1, 2 and 3 satisfy the relational expression given by $1.6x-82.00 \leq y \leq 1.6x-77.00$, especially, $y=1.6x-79.86$ ($R^2=0.9985$), where x is the ethylene content and y is the crystallization enthalpy.

Contrarily, the copolymers of Comparative Examples 1 and 2 display the higher crystallization enthalpy than the copolymers of Examples having the same ethylene content, so they do not satisfy the relational expression given by $1.6x-82.00 \leq y \leq 1.6x-77.00$. It is therefore predicted that the elastic terpolymers of Examples 1, 2 and 3 have the individual monomers evenly distributed in an alternating arrangement in the chain of the copolymer and thus display the lower degree of crystallization with respect to the ethylene content and the higher elasticity and flexibility than the elastic terpolymers of Comparative Examples.

What is claimed is:

1. An elastic terpolymer, which is a copolymer of 40 to 70 wt % of ethylene, 20 to 50 wt % of a $C_3$-$C_{20}$ alpha-olefin, and 2 to 20 wt % of a diene as obtained in the presence of a catalyst comprising a vanadium compound, wherein the elastic terpolymer satisfies:
    i) the weight average molecular weight measured by GPC is 100,000 to 500,000;
    ii) in the monomer distribution of the copolymer determined by $^{13}C$ NMR analysis, K given by the following Equation 1 is 0 to 0.003, K=[CCC]*[EEE]   [Equation 1]

wherein [CCC] is the growth rate constant when the monomer distribution of the copolymer is "alpha-olefin-alpha-olefin-alpha-olefin"; and [EEE] is the growth rate constant when the monomer distribution of the copolymer is "ethylene-ethylene-ethylene", and
    iii) the ethylene content x (wt %) of the polymer and the crystallization enthalpy y (ΔHc; J/g) measured by DSC satisfy the relational expression given by $y=1.6x-79.86$.

2. The elastic terpolymer as claimed in claim 1, wherein [CCC] is 0.02 or less.

3. The elastic terpolymer as claimed in claim 1, wherein the relational expression is satisfied in the entire ethylene content range of 40 to 70 wt %.

4. The elastic terpolymer as claimed in claim 1, wherein Re*Rc <1, wherein Re is the reactivity ratio constant representing the distribution of ethylene in the copolymer and Rc is the reactivity ratio constant representing the distribution of alpha-olefin in the copolymer, wherein Re=k11/k12 and Rc=k22/k21, wherein k11 is the growth rate constant when ethylene is bonded after ethylene in the chain of the copolymer; k12 is the growth rate constant when alpha-olefin is bonded after ethylene in the chain of the copolymer; k21 is the growth rate constant when ethylene is bonded after alpha-olefin in the chain of the copolymer; and k22 is the growth rate constant when alpha-olefin is bonded after alpha-olefin in the chain of the copolymer.

5. The elastic terpolymer as claimed in claim 1, wherein the crystallization temperature Tc measured by DSC is −55 to 30 ° C.

6. The elastic terpolymer as claimed in claim 1, wherein the elastic terpolymer has a density of 0.840 to 0.895 g/cm$^3$.

7. The elastic terpolymer as claimed in claim 1, wherein the alpha-olefin comprises at least one selected from the group consisting of propylene, 1-butene, 1-hexene, and 1-octene, and the diene comprises at least one selected from the group consisting of 5-ethylidene-2-norbornene, 5-methylene-2-norbornene, 5,-vinyl-2-norbornene, 1,4-hexadiene, and dicyclopentadiene.

8. A method for preparing the elastic terpolymer as claimed in claim 1, the method comprising:
    copolymerizing 40 to 70 wt % of ethylene, 20 to 50 wt % of a $C_3$-$C_{20}$ alpha-olefin and 2 to 20 wt % of a diene in the presence of a polymerization solvent, which is hexane, a catalyst composition comprising a vanadium compound represented by the following Chemical Formula 1, a halogen-containing organic compound represented by the following Chemical Formula 2, and a Lewis acid represented by the following Chemical Formula 3:

VO(OR)$_m$X$_{3-m}$   [Chemical Formula 1]

wherein R is a $C_1$-$C_{20}$ hydrocarbon branch; X is halogen; and m is 0 to 3,

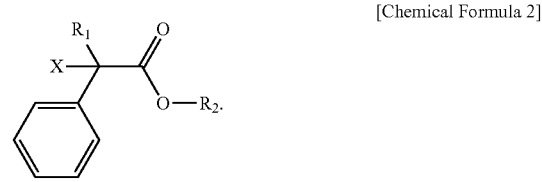

[Chemical Formula 2]

wherein RI is hydrogen, $C_1$-$C_{20}$ alkyl, $C_6$-$C_{40}$ aryl, or halogen; R2 is $C_1$-$C_{20}$ alkyl; and X is halogen, D$_1$X$_j$(R$_3$)$_n$   [Chemical Formula 3]

wherein R$_3$ is hydrogen, $C_1$-$C_{20}$ alkyl, or $C_6$-$C_{40}$ aryl; X is halogen; D is boron or aluminum; and 1, j and n are independently an integer from 1 to 6.

9. The method as claimed in claim 8, wherein the alpha-olefin comprises at least one selected from the group consisting of propylene, 1-butene, 1-hexene, and 1-octene, and the diene comprises at least one selected from the group consisting of 5-ethylidene-2-norbornene, 5-methylene-2-norbornene, 5-vinyl-2-norbornene, 1,4-hexadiene, and dicyclopentadiene.

* * * * *